US009800057B2

(12) United States Patent
Borgen

(10) Patent No.: US 9,800,057 B2
(45) Date of Patent: Oct. 24, 2017

(54) DEVICE FOR TRANSFER OF ELECTRICAL SIGNALS AND/OR ELECTRICAL ENERGY

(75) Inventor: Harald Borgen, Horten (NO)

(73) Assignee: Techni AS, Borre (NO)

( * ) Notice: Subject to any disclaimer, the term of this patent is extended or adjusted under 35 U.S.C. 154(b) by 1064 days.

(21) Appl. No.: 13/976,729

(22) PCT Filed: Dec. 28, 2011

(86) PCT No.: PCT/NO2011/000356
§ 371 (c)(1),
(2), (4) Date: Aug. 29, 2013

(87) PCT Pub. No.: WO2012/091575
PCT Pub. Date: Jul. 5, 2012

(65) Prior Publication Data
US 2013/0334894 A1    Dec. 19, 2013

(30) Foreign Application Priority Data
Dec. 28, 2010    (NO) .................................. 20101806

(51) Int. Cl.
*H02J 17/00*    (2006.01)
*H02J 5/00*    (2016.01)
(Continued)

(52) U.S. Cl.
CPC ............ *H02J 5/005* (2013.01); *E21B 47/122* (2013.01); *H04B 5/0031* (2013.01);
(Continued)

(58) Field of Classification Search
CPC .................................. H02J 17/00; H01F 38/14
(Continued)

(56) References Cited

U.S. PATENT DOCUMENTS 5,455,573 A * 10/1995 Delatorre .............. E21B 17/028
166/250.11
2003/0058127 A1* 3/2003 Babour ................ G01V 11/002
340/854.3
(Continued)

FOREIGN PATENT DOCUMENTS

EP    0 678 880 A1    10/1995
EP    0 964 134 A2    12/1999
(Continued)

OTHER PUBLICATIONS

International Search Report issued in PCT/NO2011/000356 mailed on Mar. 14, 2012 (3 pages).
(Continued)

*Primary Examiner* — Rexford Barnie
*Assistant Examiner* — Joseph Inge
(74) *Attorney, Agent, or Firm* — Osha Liang LLP

(57) ABSTRACT

A system for transmitting electrical signals and/or electrical energy via an electrically conductive medium, in which a plurality of electric wound coils is mounted on each side of the electrically conductive medium, conductors of the plurality of electric wound coils are arranged in parallel with respect to one another and each of the plurality of electric wound coils is oriented relative to each other in such a manner that winding wires are predominantly vectorially mounted in parallel, the conductors are mounted predominantly parallel to surfaces of the electrically conductive medium, the system reacts when a current is applied to the electric wound coils, thereby generating a magnetic field and generates an eddy current which circulates between an external and an internal surface of the electrically conductive medium, and a voltage is induced in the electric wound coils from the eddy current.

10 Claims, 2 Drawing Sheets

Figure 1:
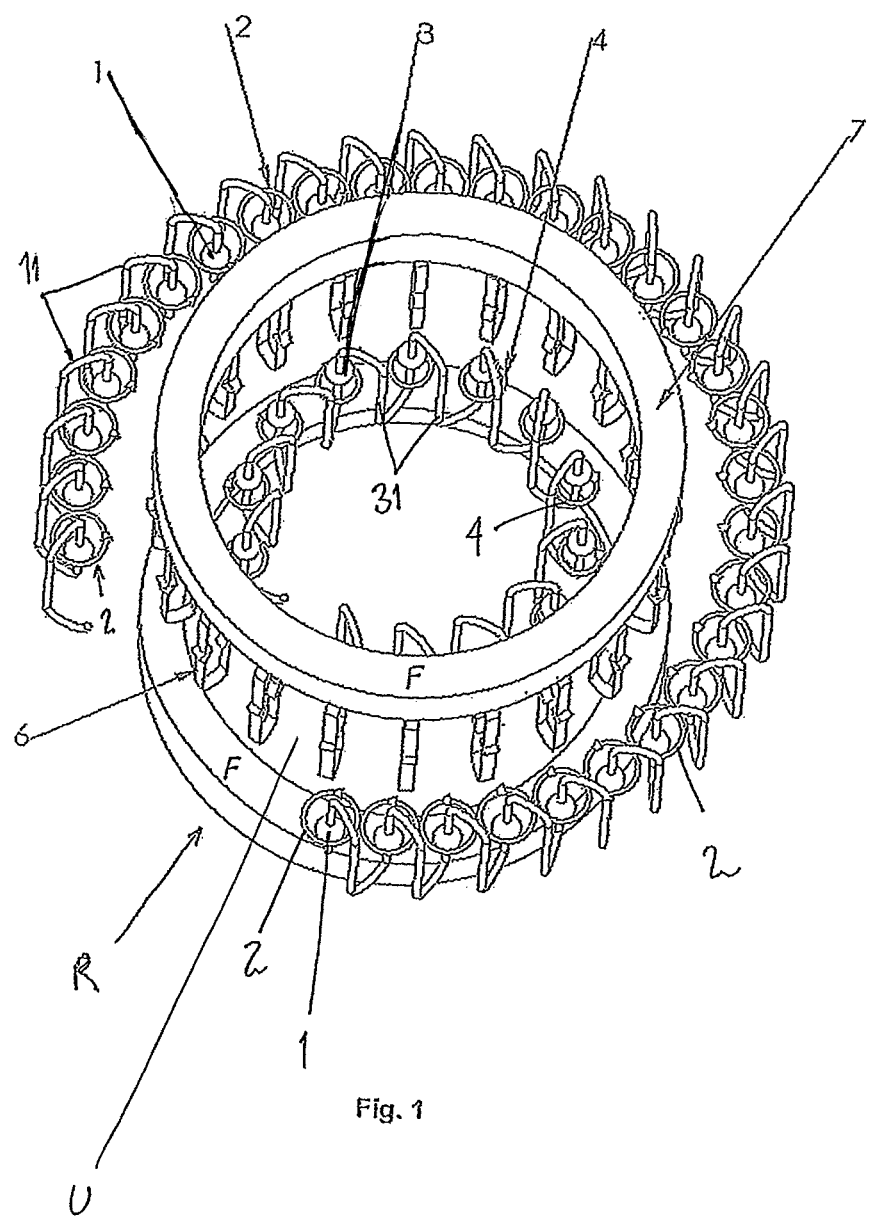

(51) Int. Cl.
  *E21B 47/12* (2012.01)
  *H04B 5/00* (2006.01)
  *H01F 38/14* (2006.01)
  *H01F 38/18* (2006.01)

(52) U.S. Cl.
  CPC ........... *H04B 5/0037* (2013.01); *H01F 38/14* (2013.01); *H01F 38/18* (2013.01)

(58) Field of Classification Search
  USPC ......................................................... 307/104
  See application file for complete search history.

(56) References Cited

U.S. PATENT DOCUMENTS

2006/0120006 A1* 6/2006 Bennertz ............... B60C 23/043
  361/143
2010/0301678 A1* 12/2010 Kim ........................ H02J 5/005
  307/104

FOREIGN PATENT DOCUMENTS

| EP | 1 662 673 A1 | 5/2006 | |
|---|---|---|---|
| GB | 499037 A | 1/1939 | |
| GB | WO 2010079327 A1 * | 7/2010 | ......... E21B 41/0085 |
| NO | 326643 B1 | 1/2009 | |
| NO | 20101742 A1 | 12/2010 | |
| WO | 2010/079327 A1 | 7/2010 | |

OTHER PUBLICATIONS

Written Opinion of the International Searching Authority issued in PCT/NO2011/000356 mailed on Mar. 14, 2012 (4 pages).
Norwegian Search Report issued in Patent application No. 20107806 issued on May 12, 2011 (2 pages).

* cited by examiner

DEVICE FOR TRANSFER OF ELECTRICAL SIGNALS AND/OR ELECTRICAL ENERGY

CROSS-REFERENCE TO RELATED APPLICATIONS

This application is a National Stage application of International Patent Application No. PCT/NO2011/000356, filed on Dec. 28, 2011, which claims priority pursuant to 35 U.S.C. §119(a) to Norwegian Patent Application No. 2010-1806, filed on Dec. 28, 2010. Both priority applications are hereby incorporated by reference in their entirety.

The present invention relates to a system for transmitting electrical signals and/or electrical energy via an electrically conductive medium. More particularly, the present invention relates to a system which is based on the induction principle with eddy current and magnetism as transmission method.

The basis for the invention is the need for a device or a system which can transmit electrical signals and/or electrical energy while communicating via an electrically conductive medium, for example a solid steel wall or a pipe. In connection with recovery of hydrocarbons, for example, in oil and/or gas wells it is desirable to employ sensors and/or instruments which can be placed on the outside or inside of accessible annuli in the well, thereby enabling characteristic data such as pressure, temperature, flow, fluid type, the well's formation characteristics etc. to be measured and monitored, in addition to which there may be a need to control and monitor one or more of these parameters via the sensors and/or the instruments without pressure barrier(s) in the oil and/or gas well being broken in any way. It is desirable, moreover, that the installed sensors and/or instruments do not require external supply of energy through power cables or the like, thereby requiring barrier-breaking devices, or batteries which have a time-limited life. An absolute requirement for equipment, such as for example instruments and/or tools, which are installed in oil and/or gas wells, is the need for robustness with regard to ambient temperature, pressure and desired service life. If technology is employed with complicated electronics, it is usually not possible to completely satisfy requirements regarding temperature and service life. These properties are closely linked to the type of electronics employed.

A number of systems exist for transmitting energy and signals based on induction or electromagnetic waves. One system based on transmitting electromagnetic waves through a metal wall is described in European patent application EP 1.662.673. This system is based on a large current being transmitted between a piece or a distance of a pipe wall via the pipe wall's longitudinal axis, with the result that the material in the pipe wall becomes magnetically saturated. When the material in the pipe wall is magnetically saturated, a window will be created in the magnetically saturated area, thereby permitting transmission of electromagnetic waves, which can communicate between one or more transmitter and receiver units mounted on each side of the pipe wall. This method has the inherent property that a large galvanic opening is created between the transmitter and receiver units' contact points and the actual pipe, which can lead to galvanic corrosion. This system will also require large amounts of electric power, making it less suitable for permanent installations on account of limitations of available power through current-carrying barriers into the well.

Other systems for transmitting signals, which are based on the same principle as that described in European patent application EP 1.662.673 are referred to in international patent application WO2010079327 A1, in which a system and a method are disclosed which permit transmission of electromagnetic waves through a pipe wall with low permeability.

A common feature of the above-mentioned publications is that the transmitted signal which has penetrated the steel pipe wall has an exponential reduction of the signal, with the result that transmitted power and subsequent signal transmission are extremely slight. This means that even though the signal can be read by known instruments and/or devices, it is highly uncertain whether the method can be used for generating energy in a receiver unit, thereby permitting a two-way communication between receiver unit and transmitter unit without the use of one or more extra energy sources, for example such as a battery or electric cable on the receiver side.

Another common feature is that the above-mentioned methods do not permit transmission of signals with greater frequency than approximately 10 KHz. Above this frequency the attenuation(s) is so great that the known, practical measuring methods cannot be employed.

The object of the invention is to remedy or reduce at least one of the drawbacks of the prior art.

Yet another object of the present invention will be to provide a simpler and more reliable system, where pressure barriers in an oil and/or gas well are not broken.

These objects are achieved with a system for transmitting electrical signals and/or electrical energy via an electrically conductive medium as indicated in the following independent claim 1, where further features of the invention will become apparent from the dependent claims and the description below.

Unlike the prior art, the system according to the present invention is based on the principle of eddy current as transmission method for electrical signals and/or electrical energy. In the present application, eddy current refers to a current of electrons which forms one or more closed loops within an electrically conductive material.

The system for transmitting electrical signals and/or electrical energy according to the present invention is a general system employed for communicating via an electrically conductive medium.

The present invention may typically be applied as a system for transmitting electrical energy and/or electrical signals for a static instrument via an electrically conductive medium in the form of a plate or a pipe, or as an independent unit in the form of a connector, where the connector in its entirety is made of metal.

The present invention may also permit transmission of electrical signals and/or electrical energy in a system, where one or more electric wound coils move in relation to one another, both axially and rotatingly. By means of an axial movement of the electric wound coils relative to one another, the system according to the present invention will be capable of communicating with one or more sensors and/or instruments as the electric wound coils pass one another axially. This may typically apply to sensors distributed along a pipeline in an oil and/or gas well, which sensors can be read by means of a wireline tool.

The present invention is based on simple, passive components which do not require additional active electronic components, which other active electronic components do not comply with the requirement to function at high temperatures and for a long service life. An inherent property possessed by the system for transmitting electrical signals and/or electrical energy via an electrically conductive medium is the possibility of assigning an electrical resonance to one or more applied sensors and/or instruments, with the result that the transmission between sensors and/or instruments, which are then arranged so as to form transmitter and receiver units, will set the transmitter and receiver units in natural oscillation (impedance matching). This causes the electrical loss to be minimised, thereby permitting the greatest possible transmission of energy and signals by means of the present invention.

The underlying physical principles on which the invention is based are:

the electrically conductive medium is a good electrical conductor, so that the eddy currents are converted to the least possible extent to heat, the principle of induction from a time-variable magnetic field creates an internal potential difference in the electrically conductive medium, which in turn leads to an eddy current. On account of the Hall effect, a force will be applied to the electrons in the eddy current in a direction which is oriented at 90 degrees to the magnetic field and the electrons' direction of travel. This means that the Hall force (electric field) presses the electrons outwards towards the surface of the electrically conductive medium (for example a metal wall in a pipe). This can be explained as follows: the magnetic field, which is parallel to the wall in the electrically conductive medium, will generate an electric field which is oriented at 90 degrees to the time-variable magnetic field parallel to the wall. When the electrons move in the electric field, on account of the Hall effect, this will cause a potential difference to be created between the surfaces (an outer and inner side) of the electrically conductive medium, with the result that the electrons are influenced by an electric force acting outwards from the inside of the conductive medium. This effect facilitates a good inductive coupling since the flow of electrons experiences a type of "skin effect" where the electrons in the eddy currents are forced out towards the surfaces of the electrically conductive medium, which in turn reinforces the magnetic field on the surface on account of eddy current on the opposite side of a driving electric coil.

The term "skin effect" in the present invention means that motion of free electrons in the metal is influenced by magnetic and electric forces, thereby creating a compression of free electrons (current) towards the surface of the metal.

In further applications the present invention may easily be employed together with all types of circuits where a time-variable modulated signal is desirable. Some examples of this are:

oscillatory circuit with crystal which changes frequency when exposed to pressure, oscillatory circuit with capacitance which is changed due to pressure or temperature, oscillatory circuit with inductance which is changed due to pressure or temperature, oscillatory circuit for modulation of signals in order to enable communication with binary numbers, transmission of electrical energy to a storage medium, transmission and communication of control signals to control devices.

The present invention relates to a system for transmitting electrical signals and/or electrical energy via an electrically conductive medium, where the system comprises at least one electric wound coil which is placed on an outside of the electrically conductive medium and at least one electric wound coil which is mounted on an inside of the electrically conductive medium. A person skilled in the art will appreciate that several electric wound coils may also be employed here. The at least one electric wound coil mounted on the outside of the electrically conductive medium will furthermore be arranged in such a manner that it is mounted above and adjacent to the at least one electric wound coil mounted on the inside of the electrically conductive medium, whereby these two electric wound coils form a "transmitter and receiver unit" in the system. Each of the electric coils' conductors will then be mounted parallel to each other, where each of the electric coils will be oriented relative to the other in such a manner that the winding wires are substantially arranged vectorially in parallel. When a time-variable current, for example from a live wire or a battery connected to the electric coil, is applied to one of the electric coils, a magnetic field will be generated with decreasing magnetic gradient (magnetic field strength) inwards in a volume which is limited by the external and internal surface of the electrically conductive medium, where the magnetic field strength generates an eddy current which will circulate between the external and internal surface of the volume of the electrically conductive medium. The electric coil, to which a time-variable current is not applied, will then receive a voltage via induction on account of the magnetic field from the eddy current created between the external and internal surface of the electrically conductive medium. On account of the above arrangement of two electric wound coils mounted above and adjacent to each other, these two electric coils will react to each other via the electrically conductive medium.

In the present invention a coil refers to a device consisting of a core (centre) with an arbitrary geometrical shape (most commonly a rectangular or circular shape) where an electrical conductor is wound around the longitudinal axis of this core.

The electrically conductive medium may be any kind of material which is electrically conductive, for example a metal, where the electrically conductive medium may further be composed of a flat surface, a pipe or be in the form of a connector with electrically conductive metal.

According to an embodiment of the present invention, one or more of the electric wound coils in the system for transmitting electrical signals and/or electrical energy may be connected in a suitable manner to one or more sensors. Such a sensor may, for example, comprise a resonance circuit, in which case the resonance circuit may be employed for measuring a characteristic frequency characterising a specific physical state or parameter. Such physical states or parameters may, for example, be pressure and temperature in an oil and/or gas well, electrical conductivity in the electrically conductive medium or the like.

The system for transmitting electrical signals and/or electrical energy according to the present invention also comprises one or more electronic circuits which are capable of measuring one or more of the above-mentioned physical states or parameters, in which case the electronic circuit or circuits are connected in a suitable manner to one or more of the electric coils in the system.

One or more of the electric coils in the system according to the present invention may be connected to a switch, where the switch is controlled by electrical signals and/or electrical energy transmitted via the electrically conductive medium. This will enable the electric coil or coils to be switched off or on as required.

In an embodiment the system for transmitting electrical signals and/or electrical energy according to the present invention also comprises an energy storage medium, where this energy storage medium may, for example, be a battery.

Figure 2:
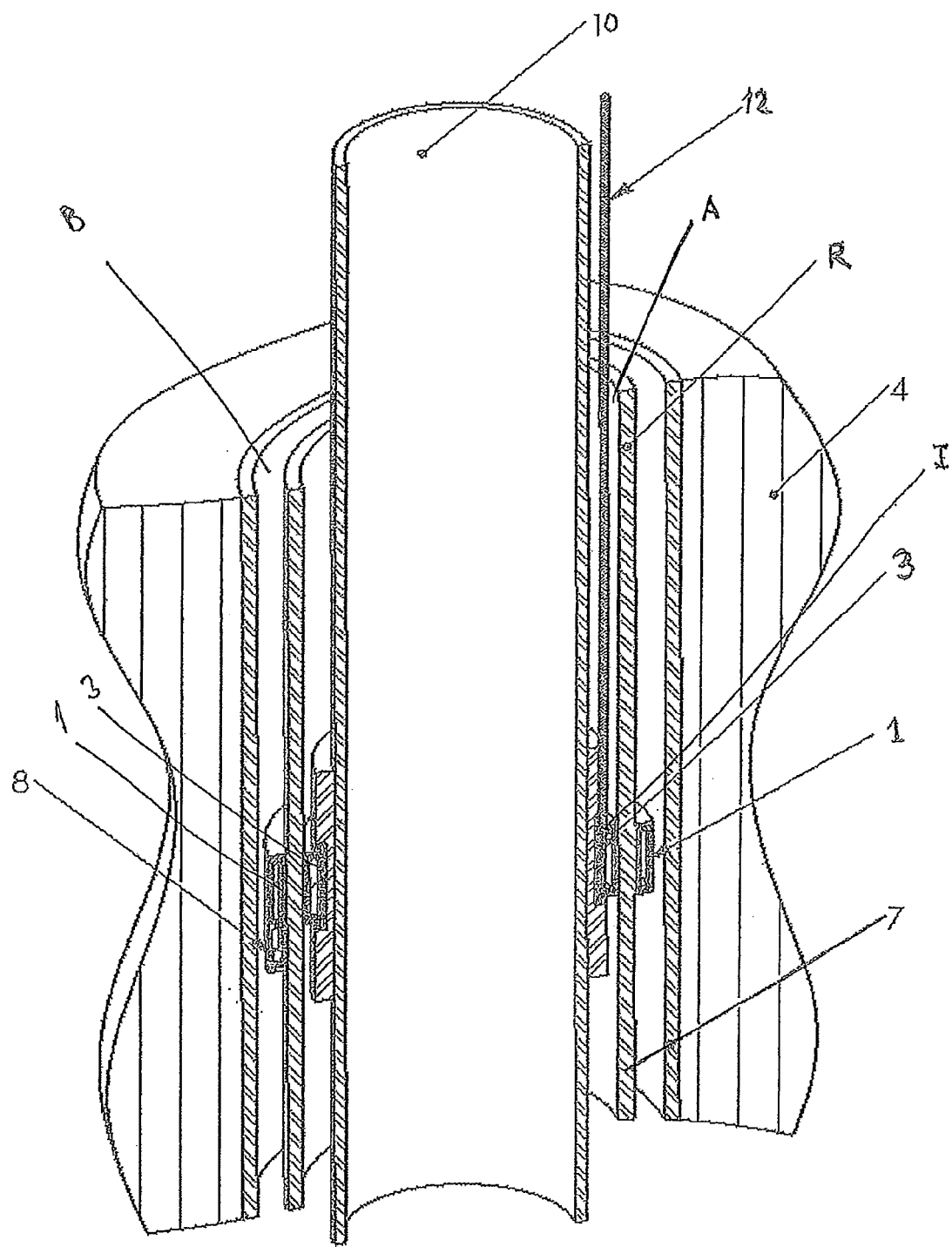

The invention will now be explained in connection with an embodiment and with reference to the attached figures, in which;

FIG. 1 illustrates the principle involved in a system for transmitting electrical signals and/or electrical energy via an electrically conductive medium according to the present invention, where the system's various components are shown in an expanded section, and FIG. 2 illustrates the use of the system for transmitting electrical signals and/or electrical energy via an electrically conductive medium according to the present invention mounted in an oil and/or gas well.

FIG. 1 illustrates a system for transmitting electrical signals and/or electrical energy via an electrically conductive medium according to the present invention, where the system is based on a principle involving eddy current as transmission method for electrical signals and electrical energy. Eddy current according to the present invention should be understood to refer to a flow of electrons which create one or more closed loops within the electrically conductive medium, for example an electrically conductive plate or a pipe R. The system comprises two or more electric wound coils 1, 3, where the winding wires 11, 31 are arranged in parallel in each electric wound coil 1, 3, and where each of the electric wound coils 1, 3 as a separate unit is oriented relative to the other, with the result that the winding wires 11, 31 are predominantly arranged vectorially in parallel. At least one electric wound coil 1, 3 will then be mounted on each side of the electrically conductive plate or the pipe R, where transmission of electrical energy and/or electrical signals is enabled by the at least one electric wound coil 1, 3 generating a time-variable magnetic field which generates magnetic field lines 2, 4 parallel to a pipe wall 7 in the pipe R or at an angle (angular specification) to the pipe wall 7. This magnetic field can then transmit an electrical signal and/or power in two different ways: if the magnetic conductivity of the pipe wall 7 is low, the transmission will substantially be based on electrical eddy current internally through the pipe wall 7, generated by the magnetic field with the magnetic field lines 2, 4 which are created parallel to the pipe wall 7.

If the pipe wall's 7 relative magnetic conductivity is great, while the electrical conductivity is small, in addition to generating electrical eddy currents, the magnetic field will also be conducted as a magnetic force through and internally in the pipe wall 7. This magnetic force will therefore be conducted in a closed loop, which is the shortest distance round the pipe wall 7, i.e. peripherally round the centre of the pipe R. Since the magnetic force or the flow runs peripherally round the pipe R, windings 31 in the electric wound coil 3, which is mounted on the opposite side of the pipe wall 7 to the electric wound coil 1, will be influenced by the magnetic force and a voltage will be induced as explained by the induction law, which is based on a time-variable magnetic field.

If the pipe wall's 7 relative magnetic conductivity is low (typical for standard casings in an oil well), the magnetic field lines 2, 4 will decrease in strength in inverse proportion to the distance inwards in the pipe wall 7, and on account of the gradient will induce an electrical eddy current in a direction 90 degrees to the magnetic field lines 2, 4 formed between the pipe wall 7 (i.e. between the inner wall and the outer wall of the pipe R). Since a circulating flow is generated along the height (vertically) of the electric wound coil 1, 3, this flow of electrons will move along the height direction (vertically) of the electric wound coil 1, 3 (i.e. at 90 degrees to the magnetic field), and at the upper edge of the electric wound coil 1, 3 will be transferred to a surface on the opposite side of the pipe R (from an outer surface to an inner surface), in order to flow back to the starting point again. Since the flow of electrons extends along the surface on the opposite side of the electric wound coil 1, the flow of electrons will form magnetic field lines 4 parallel to a surface on the opposite side of the generating electric wound coil 1. Since the flow in the electric wound coil 1 varies, the eddy current(s) between the outer and inner surfaces of the pipe R will also vary. The related variable magnetic field on the opposite side of the generating electric wound coil 1 will then induce a current in the related electric wound coil 3 based on the induction law. The system for transmitting electrical signals and/or electrical energy in an electrically conductive medium according to the present invention is furthermore non-directional and each electric wound coil 1, 3 will be able to act both as generator and receiver (transmitter and receiver unit) for electrical signals and electrical energy according to the same principle.

In FIG. 1 the pipe R is shown provided with a cutout U between the upper and lower parts. In the cutout eddy currents 6 are illustrated which arrange for the energy transport in the electrically conductive medium for the electric wound coils 1, 3. The electric wound coils 1, 3 can then be connected by means of suitable devices (not shown) to the pipe's R cutout U. In this case suitable devices may be in the form of clips, holding brackets or the like. As can also be seen in FIG. 1, the electric wound coils 1, 3 are arranged around the entire circumference of the pipe R, both externally and internally. It should be understood, however, that the electric wound coils may also be arranged over only a part of the pipe's R circumference. A person skilled in the art will know how this should be done and it is therefore not discussed further here.

FIG. 2 illustrates a typical use for the system for transmitting electrical signals and/or electrical energy according to the present invention, where the system is used for measuring pressure and/or temperature in one or more annuli in a well, without barrier-breaking devices between the separate annuli in the well.

A sensor 8 is mounted in an annulus B in the well, where the sensor 8 may, for example, be based on measuring change of capacitance. In this case the sensor 8 can measure pressure and/or temperature due to change of resonance frequencies in a circuit based on capacitance and impedance. During measuring a time-variable electrical signal will be transmitted (sinusoidal) from a transceiver I, which is connected to an electric cable 12, where the electric cable 12 extends through an annulus A. The time-variable signal will generate a magnetic field in the electric wound coil 3, which in turn generates an eddy current through the pipe wall 7 in the pipe R. On account of the eddy current 6 through the pipe wall 7 in the pipe R, the electric coil 1 will generate an induced time-variable voltage which sets a resonance circuit in the sensor 8 in oscillation. The resonance circuit in the sensor 8 will oscillate in step with the electrical signal (applied voltage) as long as transceiver I transmits energy. The moment the driven signal ceases, the resonance circuit in the sensor 8 will continue to oscillate at its characteristic natural frequency as long as there is energy in the resonance circuit in the sensor 8. The characteristic natural frequency will then generate a time-variable voltage with a frequency which is proportional to the measured parameter (pressure and/or temperature). This voltage signal will then generate a magnetic field around the electric wound coil 1, which in turn generates an eddy current 6 through the pipe wall 7 in the pipe R. On account of the eddy current in the pipe R, the electric wound coil 3 will receive an induced time-variable voltage which can be measured via the electric cable 12 connected to the transceiver I. This measuring system (sensor) is based on components which are passive, in addition to which each circuit is designed so that the resistance to the generated oscillations (impedance) is as low as possible. The actual sensor 8 may be realized in different ways by everything from active electronics such as processors and transistors to passive systems such as capacitance, inductance, crystals etc., to other mechanical resonance systems such as, for example, a piano wire.

The invention has now been explained with reference to a preferred embodiment. A person skilled in the art will appreciate that several changes and modifications of the illustrated embodiments may be undertaken which fall within the scope of the invention as defined in the following claims.

The invention claimed is:

1. A system for transmitting electrical signals and/or electrical energy via an electrically conductive medium, wherein:
   a plurality of electric wound coils is mounted on an outside and an inside of the electrically conductive medium,
   the conductors of the plurality of electric wound coils are arranged in parallel with respect to one another and each of the plurality of electric wound coils is oriented relative to each other in such a manner that winding wires are predominantly vectorially mounted in parallel,
   the conductors in turn are mounted predominantly parallel to surfaces of the electrically conductive medium,
   the system reacts when a time-variable current is applied to the electric wound coil, thereby generating a magnetic field with decreasing magnetic field strength inwards in a volume of the electrically conductive medium, wherein the magnetic field strength generates an eddy current which circulates between an external and an internal surface of the electrically conductive medium, and
   a voltage is induced in the plurality of electric wound coils on account of the magnetic field from the eddy current between the external and the internal surface of the electrically conductive medium.

2. The system according to claim 1, wherein the electrically conductive medium has a geometrical shape in the form of a flat plate or a pipe (R).

3. The system according to claim 1, wherein the plurality of electric wound coils is connected to a sensor.

4. The system according to claim 3, wherein the sensor comprises a resonance circuit which responds with a characteristic frequency characterising one or more physical states, such as pressure, temperature, and electrical conductivity.

5. The system according to claim 1, wherein at least one of the plurality of electric wound coils arranged on each side of the electrically conductive medium reacts with an adjacent electric wound coil via the electrically conductive medium.

6. The system according to claim 1, wherein at least one of the plurality of electric wound coils to which an electronic circuit is connected is capable of measuring one or more physical parameters, said electronic circuit is connected to a logging system.

7. The system according to claim 1, wherein at least one of the plurality of electric wound coils is connected to a switch which is controlled by signals and energy transmitted via the electrically conductive medium.

8. The system according to claim 1, wherein the system further comprises an energy storage medium.

9. The system according to claim 1, wherein the plurality of electric wound coils have a good electrical connection via axial separation of the electrically conductive medium.

10. The system according to claim 1, wherein the plurality of electric wound coils can move at least one of axially and rotatingly relative to each other during transmission of at least one of signals and energy.

\* \* \* \* \*